A. CHURCHWARD.
ELECTRIC POWER SYSTEM FOR INTERNAL COMBUSTION ENGINES.
APPLICATION FILED MAR. 3, 1915.
1,194,713.
Patented Aug. 15, 1916.
2 SHEETS—SHEET 1.
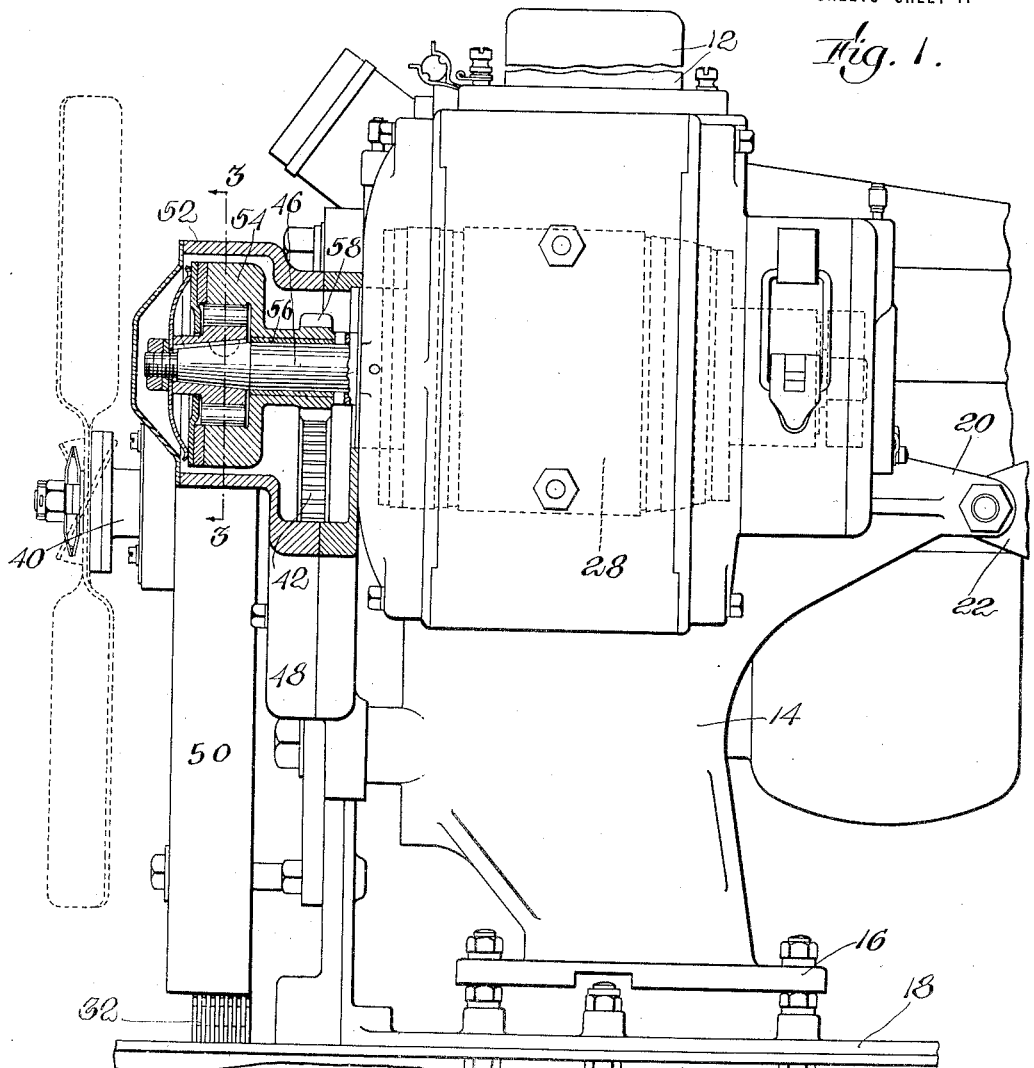
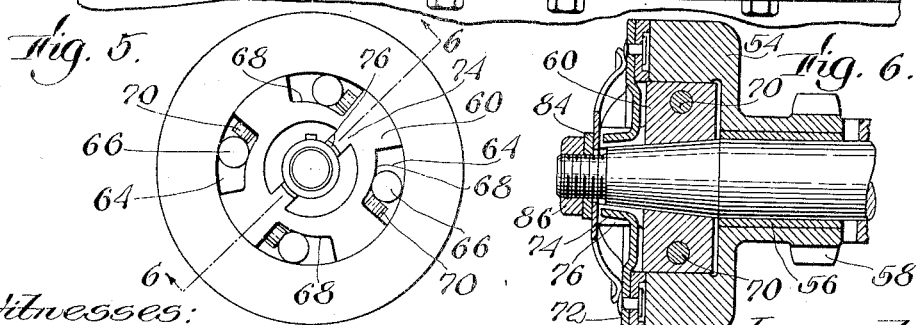
Witnesses:
Geo. L. Stebbins
Bessie J. Smith
Inventor:
Alexander Churchward
by Phillips Van Everen & Fish
attys

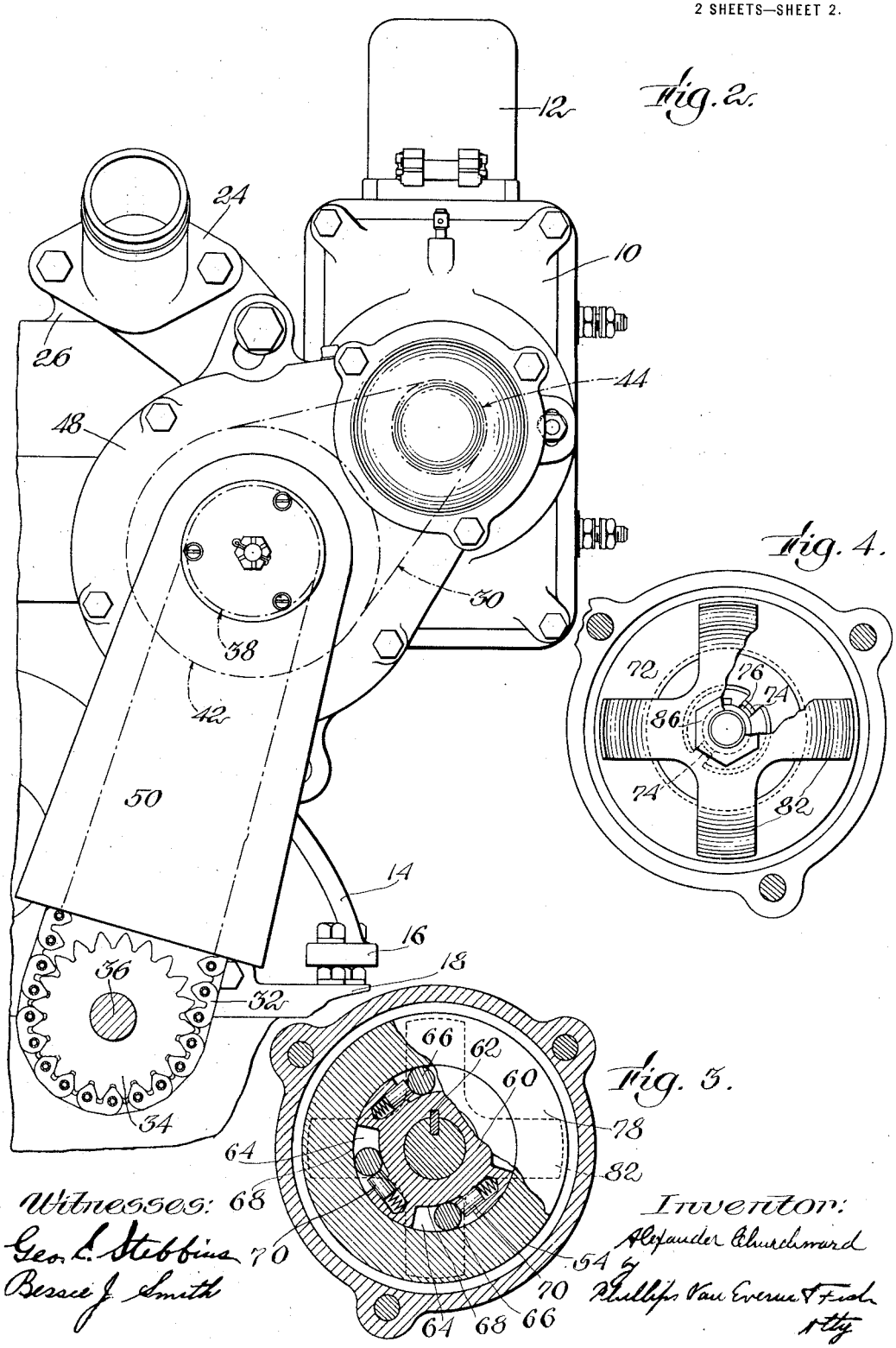

UNITED STATES PATENT OFFICE.

ALEXANDER CHURCHWARD, OF BOSTON, MASSACHUSETTS, ASSIGNOR TO A-B-C STARTER COMPANY, OF DETROIT, MICHIGAN, A CORPORATION OF MICHIGAN.

ELECTRIC POWER SYSTEM FOR INTERNAL-COMBUSTION ENGINES.

1,194,713. Specification of Letters Patent. Patented Aug. 15, 1916.

Application filed March 3, 1915. Serial No. 11,819.

*To all whom it may concern:*

Be it known that I, ALEXANDER CHURCHWARD, a citizen of the United States, residing at Boston, in the county of Suffolk and State of Massachusetts, have invented certain new and useful Improvements in Electric Power Systems for Internal-Combustion Engines; and I do hereby declare the following to be a full, clear, and exact description of the invention, such as will enable others skilled in the art to which it appertains to make and use the same.

The present invention relates to electric power systems for internal combustion engines, such as systems in which a dynamo-electric machine is driven from the engine as a generator, or a dynamo-electric machine is both driven from the engine as a generator and drives the engine as a motor, and more particularly to the power transmitting mechanism between the engine and dynamo-electric machine and the method of transmitting the power.

Some types of internal combustion engines, particularly those which are not provided with heavy fly wheels, sometimes have a pulsating rotation due to the time intervals between the explosions in the cylinders, especially at low speed. The force or driving torque applied to the power transmitting mechanism between the engine and dynamo-electric machine is, therefore, not uniform, because the reaction due to the inertia of the armature of the dynamo-electric machine opposes the sudden accelerations of the engine speed. These sudden accelerations not only put undue jerking strains and wear upon the power transmitting mechanism but they cause an objectionable grinding noise in such mechanism. Moreover, when the engine is first started and the initial explosions take place in the cylinders, the engine should be allowed to accelerate rapidly and quickly attain a good running speed, so that it is then desirable to relieve the engine as much as possible of having to accelerate the armature of the driven dynamo-electric machine which is generally connected to the engine by speed increasing gearing.

In the power transmitting mechanism of the present invention, provision is made for a certain amount of slip which will take place when the driving force or torque between the engine and the dynamo-electric machine exceeds a certain amount, so that the sudden accelerations of the engine will not cause sudden accelerations of the dynamo-electric machine. The power transmitting mechanism is relieved of sudden or jerking strains when the engine is running unevenly, and the engine is relieved of the extra load which would otherwise be caused by overcoming the inertia of the dynamo-electric machine armature when the engine rapidly accelerates upon starting.

The present invention may be employed with particular advantage in systems in which the dynamo-electric machine acts as a dynamo or as a motor (that is, when it not only is driven as a dynamo from the engine but also serves as a motor to start the engine), and particularly in systems of this type in which there is a fixed speed or gear ratio between the dynamo motor and the engine. In systems having a fixed speed ratio, it is necessary that the speed ratio be fairly high in order that the dynamo may exert a sufficient torque on the engine to start it, particularly in cold weather when the cylinder oil tends to congeal. Because of this high speed ratio, a rapid acceleration of the armature puts a considerable load on the engine and the power transmitting mechanism, and the provision made by the present invention to permit a slip in the power transmitting mechanism is particularly advantageous. When the dynamo drives the engine to start it, it must exert a considerable torque, and a torque which is greater than the torque necessary to cause the slip in the mechanism when the dynamo is driven as a generator. In such cases, the mechanism of the present invention is so arranged that when the dynamo drives the engine, the drive is positive in order to apply the full torque of the dynamo to the engine, but when the dynamo is driven as a generator, the connection is not positive but slips when the torque exceeds a predetermined amount so as to relieve the engine and the power transmitting connections of the load which would otherwise be incident to the sudden and rapid accelerations of the armature.

In the drawings the invention is illustrated as applied to the power transmitting mechaninsm of a dynamo electric machine of well known construction.

In the illustrated embodiment of the invention Figure 1 is a side elevation partly in section showing the dynamo, its housing and bracket, and part of the engine; Fig. 2 is an end elevation of the dynamo motor; its housing and bracket, and part of the engine; Fig. 3 is a section of the combined clutch taken on the line 3—3 of Fig. 1; Fig. 4 is an end view of the combined clutch partly broken away; Fig. 5 is an end view of the roller clutch of the combined clutch; and Fig. 6 is a section of the combined clutch taken along the line 6—6 of Fig. 5.

Referring to the illustrated embodiment of the invention, the dynamo 10 with its regulator 12 are incased and mounted on an assembly bracket 14 which, in turn, is mounted on the engine. The assembly bracket 14 is provided with a flange 16 which is bolted to the flange 18 of the engine crank case, a flange 20 which is bolted to the water inlet flange 22 of the engine, and a flange 24 which is bolted to the water outlet flange 26 of the engine. The power transmitting mechanism between the armature 28 of the dynamo and the engine includes two chains 30 and 32. The chain 32 extends between the sprocket wheel 34 mounted on the engine shaft 36 and the sprocket wheel 38 mounted on the fan shaft 40. The chain 30 extends between a second sprocket wheel 42 also mounted on the fan shaft 40 and a sprocket wheel 44 which is connected with the armature shaft 46. The chains are inclosed in suitable chain housings 48 and 50. The ratio of the sprocket wheels is such that the dynamo armature runs at a considerably greater speed than the speed of the engine shaft. The dynamo 10 is of the constant potential type, its potential being regulated for variations in speed by means of the regulator 12. This regulation is described in my co-pending application Serial No. 816,768. The torque necessary to drive the dynamo as a generator is substantially the same for the widely varying speeds at which the dynamo is designed to run. The dynamo is assembled with its regulator, casing and assembly bracket at the factory and is applied as a unit to the engine.

When the dynamo serves as a motor to drive the engine, the drive is positive but when the engine drives the dynamo as a generator, the driving connection permits a certain amount of slip. This is provided for by the combined clutch indicated generally by reference numeral 52 which is mounted on the end of the armature shaft 46. The combined clutch consists of a one direction roller or Horton clutch and a friction clutch. The loose member 54 of the clutch is rotatably mounted on the shaft 46 about a bearing formed by bronze bushing 56. On the hub portion of the loose member 54 is carried the sprocket 58 for the chain 30. The forward end of the loose clutch member 40 is cup shaped and incloses the fast member 60 of the clutch which is rigidly held on the armature shaft 46 by means of a key 62. The fast member 60 has pockets 64 in which are held the usual clutch rollers 66 which work on inclined planes 68 and are yieldingly held by means of spring pressed plungers 70. When the dynamo serves as a motor to start the engine, the armature shaft is turned in such a direction as to cause the roller clutch to positively lock the fast and loose clutch members together so that there is a positive driving connection between the dynamo and the engine shaft.

The friction clutch consists of a friction disk 72 which is keyed to the fast member 60 by means of a pair of tongues 74 which project into a pair of oppositely disposed recesses 76 formed in the forwardly projecting hub of the fast member 60. A wear plate 78 is riveted to the friction disk 72 and bears against the flat front face of the loose member 54. A cross-shaped spring 82 serves to hold the friction disk 72 with its wear plate 76 against the loose member 54. The tension of the spring 82 is adjusted by means of a shim or shims 84 between the spring 82 and the clamp nut 86 which is threaded on the end of the armature shaft. By means of this adjustment the amount of torque necessary to cause the friction clutch to slip may be predetermined.

The operation of the power transmitting mechanism is as follows: When the dynamo drives the engine to start it, the roller clutch forms a positive connection between the armature shaft and the engine shaft. When the engine drives the dynamo as a generator the roller clutch is disengaged and the armature shaft is driven through the friction clutch. During the normal running of the engine, the force or torque exerted on the friction clutch is not sufficient to cause any slip so that the armature is normally driven at a constant speed ratio to the engine. In case the torque applied to the friction clutch exceeds a certain amount, the friction clutch will allow a slip to take place between the loose member 54 and the wear plate 78 of the friction disk 72. Since the dynamo, driven as a generator, requires a substantially uniform normal driving torque at different speeds, the friction clutch may be adjusted to transmit a sufficient driving torque for the normal running of the dynamo, but to slip upon the application of a torque somewhat in excess of the normal driving torque. By such adjustment the friction clutch, while it will serve to gradually accelerate the armature and bring it up to full speed shortly after the engine has attained full even running speed, nevertheless will slip when the engine is accelerating, so that in the short time that the engine is picking up speed in starting, the engine will be relieved of the load which it will otherwise have to assume in overcoming the inertia of the armature, and the power transmitting mechanism which includes the chains and sprockets is relieved of jerking strains to which it would otherwise be subjected by uneven running of the engine.

The slip in the friction clutch will take place regardless of what speed the engine is running, being dependent only upon the amount of force or torque applied to the clutch.

In the illustrated embodiment of the invention, the combined clutch is shown as mounted on the armature shaft, but it will be apparent that it might be otherwise mounted.

While one embodiment of the invention has been specifically illustrated and described, it is to be understood that the invention is not limited to the illustrated details of construction, but may be embodied in other structures within the scope of the invention as set forth in the following claims.

I claim—

1. The combination with an internal combustion engine and a dynamo, of power transmitting mechanism between the engine and dynamo including a positive clutch for driving the engine from the dynamo and a yielding clutch for driving the dynamo from the engine, said clutches being inter-engaged to coöperate at all times.

2. The combination with an internal combustion engine and a dynamo, of power transmitting mechanism between the engine and dynamo including a combined clutch which comprises a clutch for positively driving the engine from the dynamo and a friction clutch engaged with said positive clutch for driving the dynamo from the engine which will slip on a face of the driven member whenever the torque on the transmitting mechanism exceeds a predetermined amount.

ALEXANDER CHURCHWARD.

Witnesses:
 WILLIAM B. MOSES,
 R. HOYT MOSES.